(12) United States Patent
Manabe et al.

(10) Patent No.: US 7,199,910 B2
(45) Date of Patent: Apr. 3, 2007

(54) ORIGINAL FEEDING APPARATUS, ORIGINAL READING APPARATUS, AND IMAGE FORMING APPARATUS

(75) Inventors: Kenichi Manabe, Tokyo (JP); Kazuyuki Iwamoto, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 844 days.

(21) Appl. No.: 10/170,589

(22) Filed: Jun. 14, 2002

(65) Prior Publication Data
US 2002/0196481 A1 Dec. 26, 2002

(30) Foreign Application Priority Data
Jun. 22, 2001 (JP) .............................. 2001-189312

(51) Int. Cl.
*H04N 1/04* (2006.01)
(52) U.S. Cl. ...................... 358/474; 358/505; 358/497; 358/496
(58) Field of Classification Search ................ 358/474, 358/505, 498, 497, 496
See application file for complete search history.

(56) References Cited

U.S. PATENT DOCUMENTS 4,378,154 A * 3/1983 Hoffman ..................... 399/165
4,449,881 A * 5/1984 Lane .......................... 414/428
4,470,695 A * 9/1984 Holzhauser et al. .......... 355/75
4,548,491 A * 10/1985 Eiland ........................ 399/107

FOREIGN PATENT DOCUMENTS

EP 0 866 600 A2 9/1998
JP 2000-92275 3/2000

* cited by examiner

Primary Examiner—Douglas Q. Tran
Assistant Examiner—Negussie Worku
(74) Attorney, Agent, or Firm—Fitzpatrick, Cella, Harper & Scinto

(57) ABSTRACT

An original feeding apparatus is located above an image forming portion for recording an image on a recording medium and is constructed to convey an original to an image reading portion slidable in a slide direction relative to the image forming portion. The original feeding apparatus is slidable integrally with the image reading portion relative to the image forming portion and has its center of gravity located on the rear end side with respect to the center in the slide direction.

9 Claims, 8 Drawing Sheets

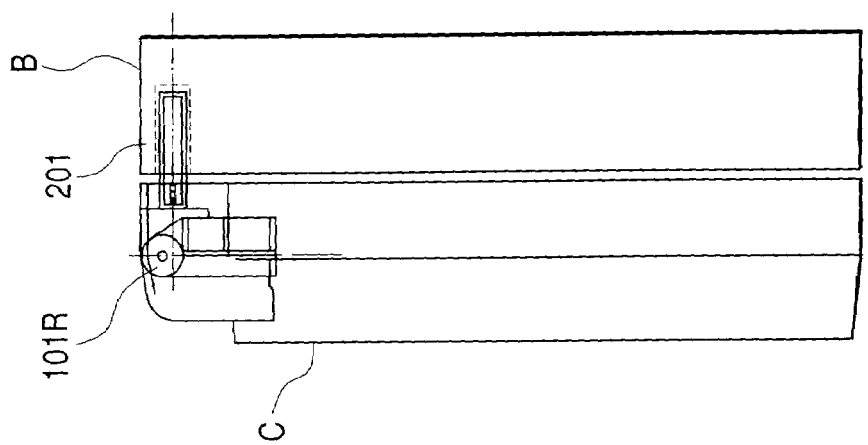
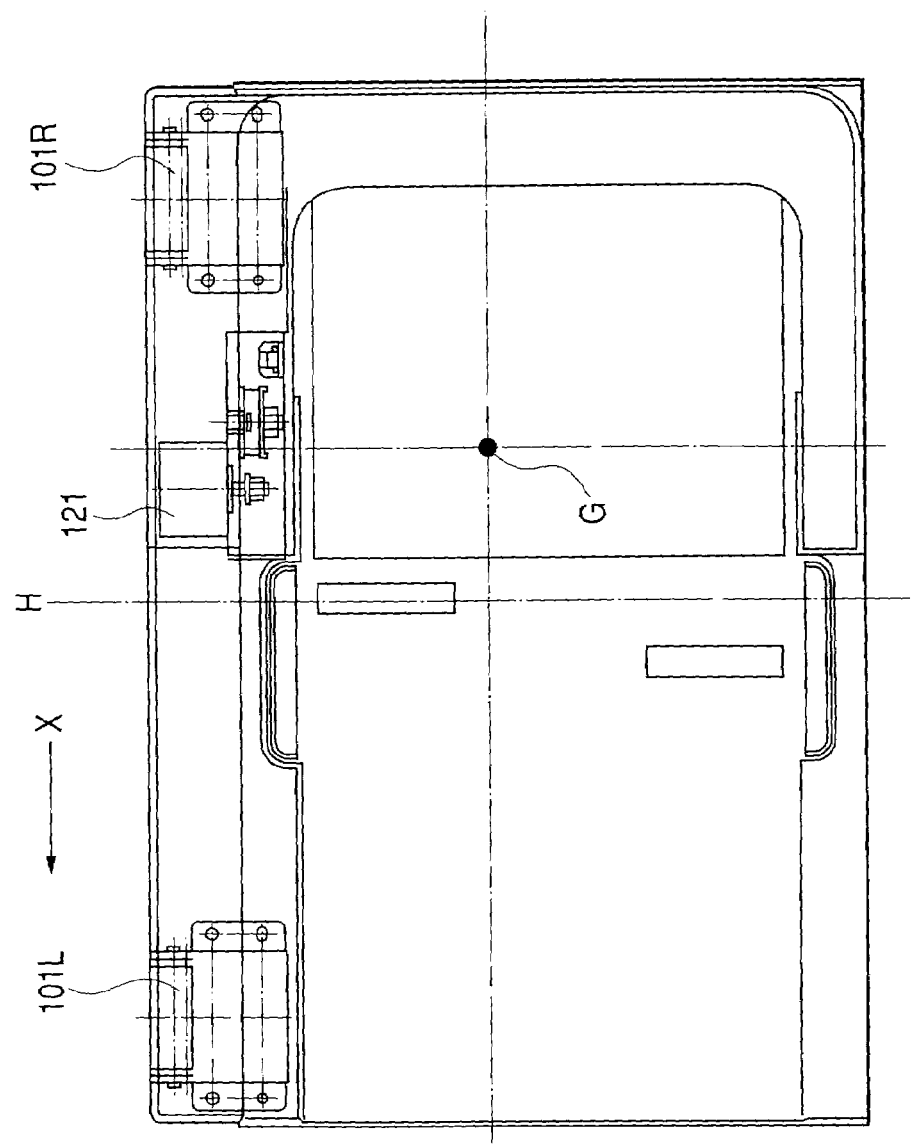

ORIGINAL FEEDING APPARATUS, ORIGINAL READING APPARATUS, AND IMAGE FORMING APPARATUS

BACKGROUND OF THE INVENTION

1. Field of the Invention

The present invention relates to an original feeding apparatus for feeding originals one by one from an original stack to a predetermined reading position in the main body of a copying machine, an original reading apparatus, and an image forming apparatus provided with them. More particularly, the invention relates to an original feeding apparatus installed in an image forming apparatus with a mechanism for sliding the original feeding apparatus and an image reading portion, and constructed to be able to decrease variation in the position of the center of gravity of the image forming apparatus in the sliding operation and reduce the apparatus in size, an original reading apparatus, and an image forming apparatus provided with them.

2. Description of Related Art

As conventional digital copying machines, facsimile machines, etc., there are image forming apparatuses consisting of an image forming portion A, an image reading portion B, and an original feeding apparatus C for feeding originals one by one to the reading position in the image reading portion B and discharging each original after completion of reading onto an original discharge table, as shown in FIG. 7.

The image reading portion B shown in FIG. 7 is constructed in structure wherein scanning rails 52 are located on the left and right sides of a frame 51 and an original reading sensor 53 runs on the rails and in parallel with an original glass stand 54 to read an original set on the original glass stand 54 (in a book mode).

The original glass stand 54 is provided with a butt member 55 for setting an original P by butting the edge of the original P against it.

A reader motor 56 translationally moves the original reading sensor 53 along the scanning rails 52 by a driving portion 57, as shown in FIG. 8.

In an operation of reading originals fed from the original feeding apparatus C, the original reading sensor 53 is located at the reading position D (see FIG. 7) and the originals are fed and conveyed one by one from an original stacking tray 58 of the original feeding apparatus C to be moved in the sub-scanning direction above the reading position D whereby each original is read.

Some image forming apparatuses have a mechanism for sliding the image reading portion B relative to an outer cover and unit and relative to the image forming portion A on occasions of mounting or dismounting a process cartridge, or performing maintenance inside the apparatus for inspection and the like.

In the apparatus shown in FIG. 7, a lever 59 is pulled to enable sliding of the image reading portion B in the X-direction (to the left).

Since the original feeding apparatus C is fixed at a predetermined position of the image reading portion B, the original feeding apparatus is also slid together with the image reading portion B during the sliding operation of the image reading portion B.

However, the image reading portion B is composed of a number of components including the frame 51, the original glass stand 54, the original reading sensor 53, the driving portion for driving the original reading sensor 53 (the motor 56 and others), and so on. Further, the original feeding apparatus C is also composed similarly of a number of components including a plurality of rollers for conveying an original, a frame, a discharge tray, a driving portion, etc. As a result, the image reading portion B and the original feeding apparatus C sum up, for example, even to the weight of 2 kg or more in certain cases.

Particularly, in the case of the original feeding apparatus C, the center of gravity thereof is located on the left side, because a lot of components are positioned on the reading position D side, as shown in FIG. 7.

In the case where the sliding units have the weight as described above and the center of gravity is located on the front end side (the left side) in the sliding direction, the position of the center of gravity of the image forming apparatus varies during the sliding operation, and the image forming apparatus becomes easy to lean to the side of sliding shift.

Further, if the sliding units themselves have an ill center of gravity balance, they will be slid while leaning to the center of gravity side, resulting in failure in smooth sliding.

Since the original edge butt member 55 in the book mode is located on the left side and the reading position in the flow-reading mode is further located on the left side, as shown in FIG. 7, the butt member 55 has to be positioned on the right side of the reading portion D. This necessitates increasing the lateral width of the original glass stand 54, which will lead to a problem of inducing an increase in size of the apparatus.

Further, since the driving portion (reader motor 56) for driving the reading sensor 53 of the image reading portion B requires a space larger than the other parts in the direction along the height of the image reading portion B, the reader motor 56 projects to the side of the image forming portion A, as shown in FIG. 7. Accordingly, the image forming portion A must be cut off in the moving range of the reader motor 56 in order to allow the sliding motion of the image reading portion B. If the moving range of the reader motor 56 is large, the cut region of the image forming portion A will be large and no component can be set in that region, posing a problem of inducing an increase in size of the apparatus in the height direction.

SUMMARY OF THE INVENTION

The present invention has been accomplished in order to solve the above problems and an object of the invention is to provide, in an image forming apparatus with a mechanism for sliding an original feeding apparatus and an image reading portion, an original feeding apparatus and an original reading apparatus adapted to be able to decrease the variation in the position of the center of gravity of the image forming apparatus in the sliding operation and to reduce the size of the apparatus and therefor the image forming apparatus provided with them.

In order to achieve the above object, a typical configuration according to the present invention is an original feeding apparatus located above an image forming portion for recording an image on a recording medium and constructed to convey an original to an image reading portion which is slidable in a shift direction relative to the image forming portion, the original feeding apparatus being slidable integrally with the image reading portion relative to the image forming portion and having its center of gravity on the rear end side with respect to the center in the shift direction.

In the above configuration, the variation is small in the position of the center of gravity of the image forming apparatus in the sliding operation of the image reading portion and the image forming apparatus can be stably installed. In addition, the image reading portion can be smoothly slid by a small slide force.

Since the above configuration suppresses the leaning of the image reading portion in the sliding operation in the shift direction, it is feasible to eliminate the cause of deformation on the apparatus frame, and this is also effective to stabilization of image quality.

Thanks to the above-stated configuration, the present invention decreases the variation in the position of the center of gravity of the image forming apparatus in the sliding operation of the image reading portion in the shift direction and permits the image forming apparatus to be stably installed. In addition, the image reading portion can be smoothly slid by a small slide force.

Since the above configuration suppresses the leaning of the image reading portion in the sliding operation in the shift direction, it is feasible to eliminate the cause of deformation on the apparatus frame, and this is also effective to stabilize image quality.

Since the reading position in the flow-reading mode is set on the rear end side with respect to the center in the shift direction, it is feasible to implement the reduction in size of the image reading portion.

Further, an original conveying motor is located on the rear end side in the shift direction and a sensor conveying motor of the original reading portion is located on the front end side in the shift direction, whereby a good balance is established between the centers of gravity of the original feeding apparatus and the image forming apparatus and the sliding range of the sensor conveying motor becomes small, thereby achieving a reduction in size of the apparatus.

BRIEF DESCRIPTION OF THE DRAWINGS

FIG. 4A is a top plan view showing a fixed state of the original feeding apparatus and the image reading portion, and FIG. 4B is a right side view thereof;

DETAILED DESCRIPTION OF THE PREFERRED EMBODIMENT

The image forming apparatus using the original feeding apparatus according to an embodiment of the present invention will be described below with reference to the drawings.

(Overall Configuration of Apparatus)

Figure 1:
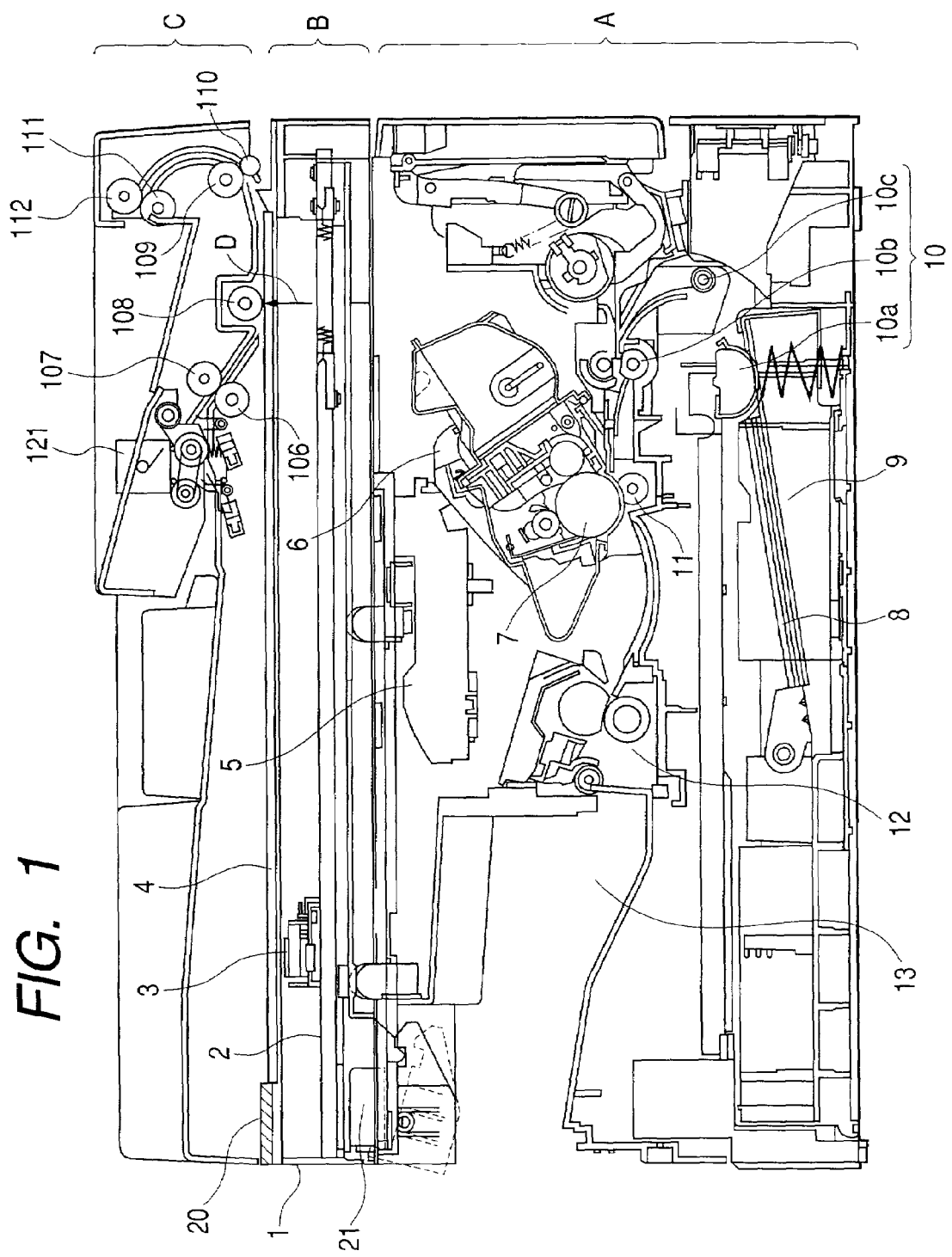
FIG. 1 is a front sectional illustration of an image forming apparatus according to an embodiment of the present invention.

FIG. 1 is a front sectional illustration of the image forming apparatus of the present embodiment. The main body of the image forming apparatus (copying machine) shown in FIG. 1 is generally composed of an image forming portion A, an image reading portion B, and an original feeding apparatus C. The present embodiment will be described in a configuration wherein the image reading portion B and the original feeding apparatus C are independent of each other, but the present invention also presents like effect in a configuration wherein the image reading portion B and the original feeding apparatus C are integrated as an original reading apparatus.

The image reading portion B is constructed in the structure in which scanning rails 2 are located on the left and right sides of frame 1 and in which an original reading sensor 3, e.g. a contact image sensor (CIS), runs on the scanning rails 2 and in parallel with an original glass stand 4 to read an original set on the original glass stand 4 (in the book mode).

A butt portion 20 is provided for setting an original by butting the front edge (left side) of the original against it. In the operation of reading the originals fed from the original feeding apparatus C, the original reading sensor 3 is located at the reading position D, the originals are fed and conveyed one by one from the original stacking tray of the original feeding apparatus C, and each original is moved in the sub-scanning direction above the reading position D to be read (in the flow-reading mode).

In both of the book mode and the flow-reading mode, a reader motor 21 for moving the original reading sensor 3 is located on the left side of the original reading portion B (see FIG. 1).

The image information read in the aforementioned book mode and flow-reading mode is transferred through a cable (not shown) to a scanner unit 5 on the image forming portion A side.

The scanner unit 5 projects information light based on the image information onto a photosensitive drum (drum-shaped photosensitive member) 7 in a process cartridge 6 to form a latent image on the photosensitive drum 7, and this latent image is developed with a developer (hereinafter referred to as "toner") to form a toner image.

In synchronism with the formation of the toner image, recording media (sheets of paper or the like) 8 are separated and fed one by one from a feed cassette 9 by a pickup roller 10a, each recording medium is conveyed by a conveying means 10 consisting of a conveying roller 10b, a registration roller pair 10c, etc., the toner image formed on the photosensitive drum 7 in the cartridge form as the process cartridge 6 is transferred onto the upper surface of the recording medium 8 by applying a voltage to a transferring roller 11 as a transferring means, the recording medium 8 is conveyed to a fixing means 12 by the conveying means 10, heat and pressure are applied to the passing recording medium 8 to fix the transferred toner image, and the recording medium is discharged onto a discharge portion 13.

(Slide Configuration of Image Reading Portion)

Figure 2:
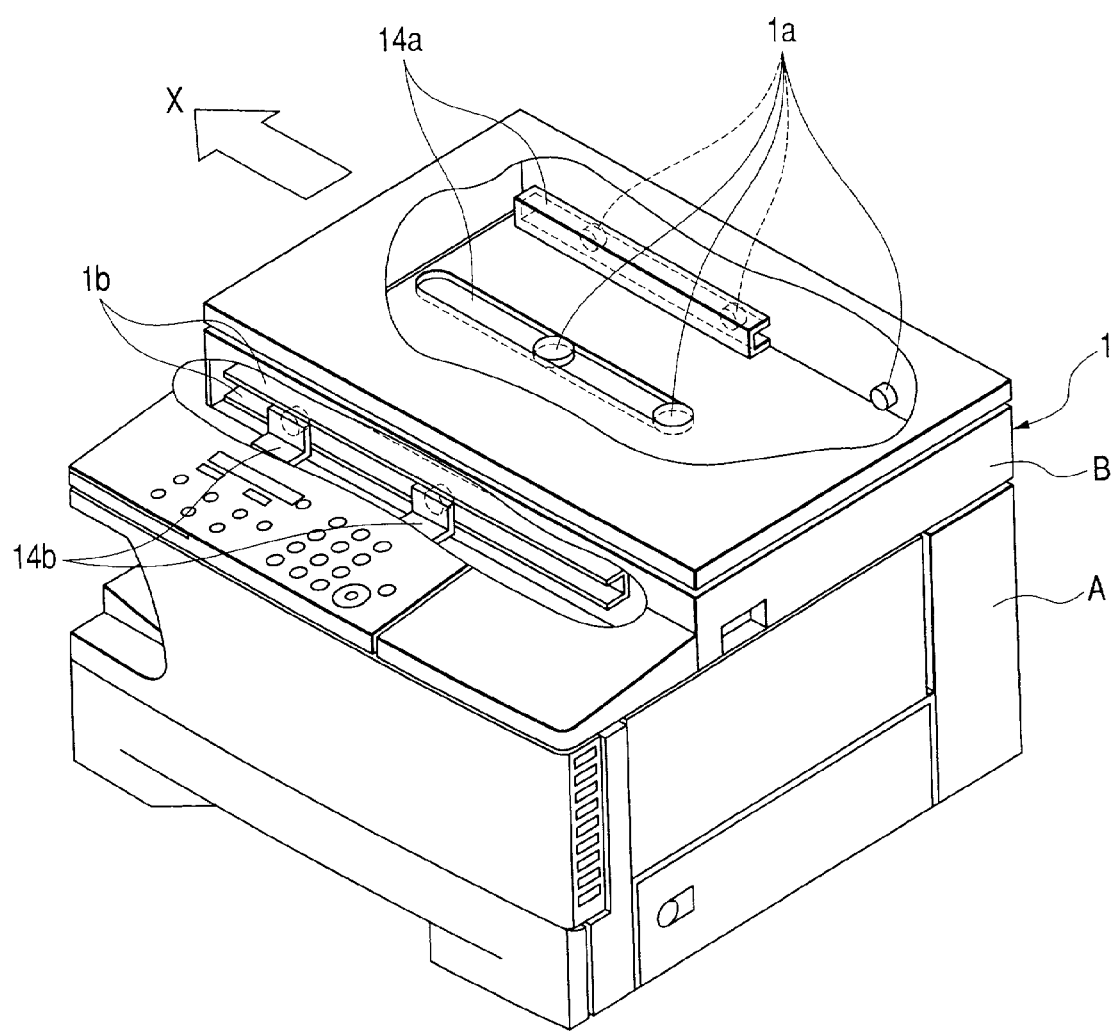
FIG. 2 is a perspective illustration illustrating a slide configuration of the image forming portion and the image reading portion.

The slide configuration of the image reading portion B will be described below. FIG. 2 is a perspective illustration illustrating the slide configuration of the image forming portion A and the image reading portion B, which shows a dismounted state of the original feeding apparatus C to be fixed on the image reading portion B.

Figure 3:
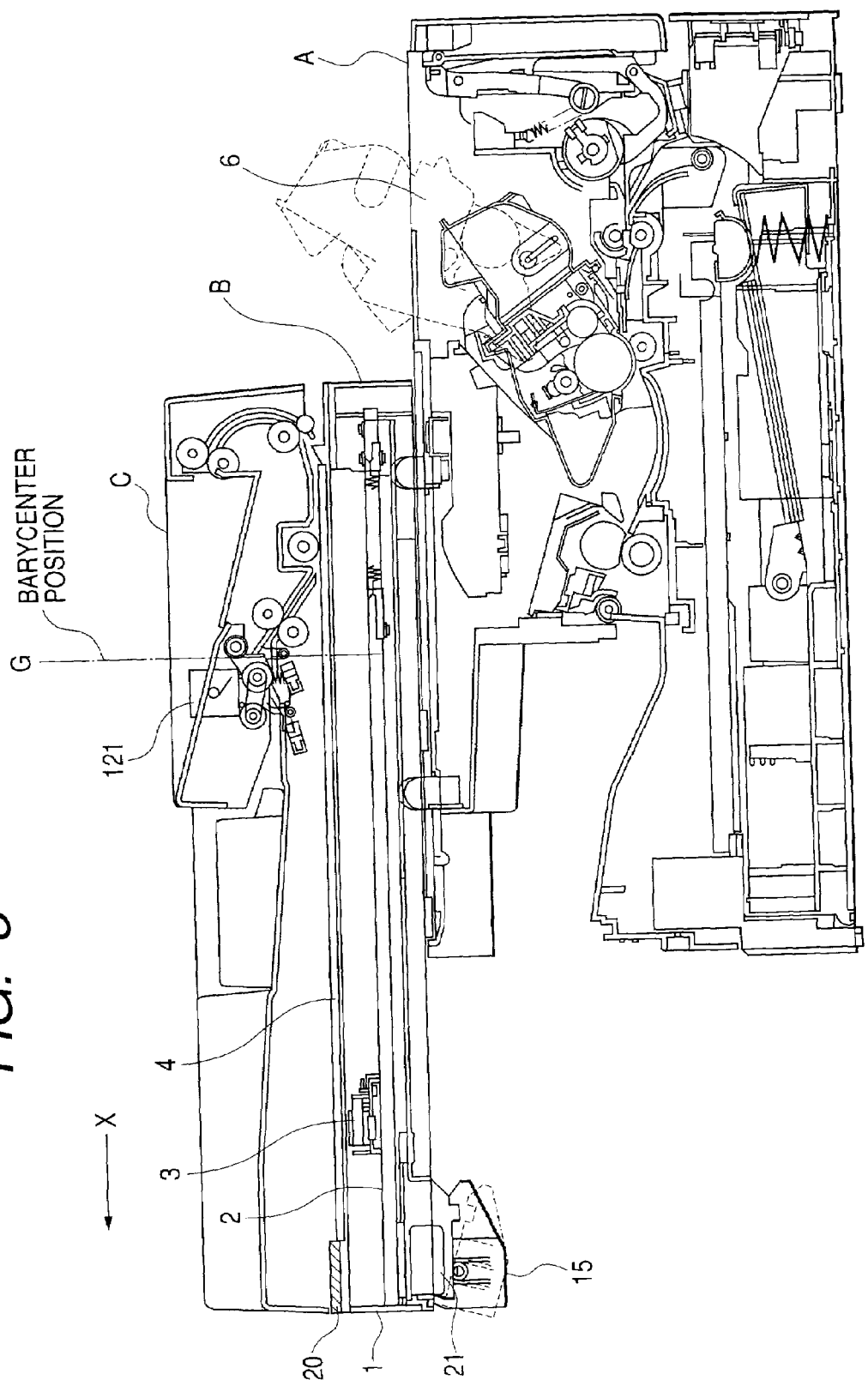
FIG. 3 is a sectional illustration showing a state in which the image reading portion is slid relative to the image forming portion.

The image forming portion A and the image reading portion B are connected to each other by bosses 1a and rail guide 1b formed on the frame 1 of the image reading portion B and by rail guides 14a and bosses 14b provided on the top surface portion on the image forming portion A side, and the image reading portion B is configured to be slid to the left in FIG. 3 relative to the image forming portion A when a lever 15 shown in FIG. 3 is pulled in the direction indicated by the arrow X (the shift direction). When the image reading portion B is slid in the shift direction relative to the image forming portion A, the region above the process cartridge 6 becomes largely open (see FIG. 3). In this state an operator can perform various processes including replacement of the process cartridge 6, handling a jam of a recording medium 8 in the conveying operation, and so on. After completion of these processes, the operator slides the image reading portion in the direction opposite (return direction) to the direction indicated by the arrow X. Therefore, the above configuration facilitates the various processes including the cartridge replacement process and others.

(Configuration of Original Feeding Apparatus)

The original feeding apparatus C will be described below. FIGS. 4A and 4B are illustrations showing a fixed state of the original feeding apparatus C and the image reading portion B, wherein FIG. 4A is a top plan view and FIG. 4B is a right side view.

The original feeding apparatus C is a device that can be mounted on the top of the image reading portion B by option and, as shown in FIG. 4B, the original feeding apparatus C is fixed in such a state that hinges 101L, 101R are slid into hinge receivers 201 of the image reading portion B. Accordingly, as shown in FIG. 3, the original feeding apparatus C is also slid integrally with the image reading portion B during the sliding operation of the image reading portion B.

Figure 5:
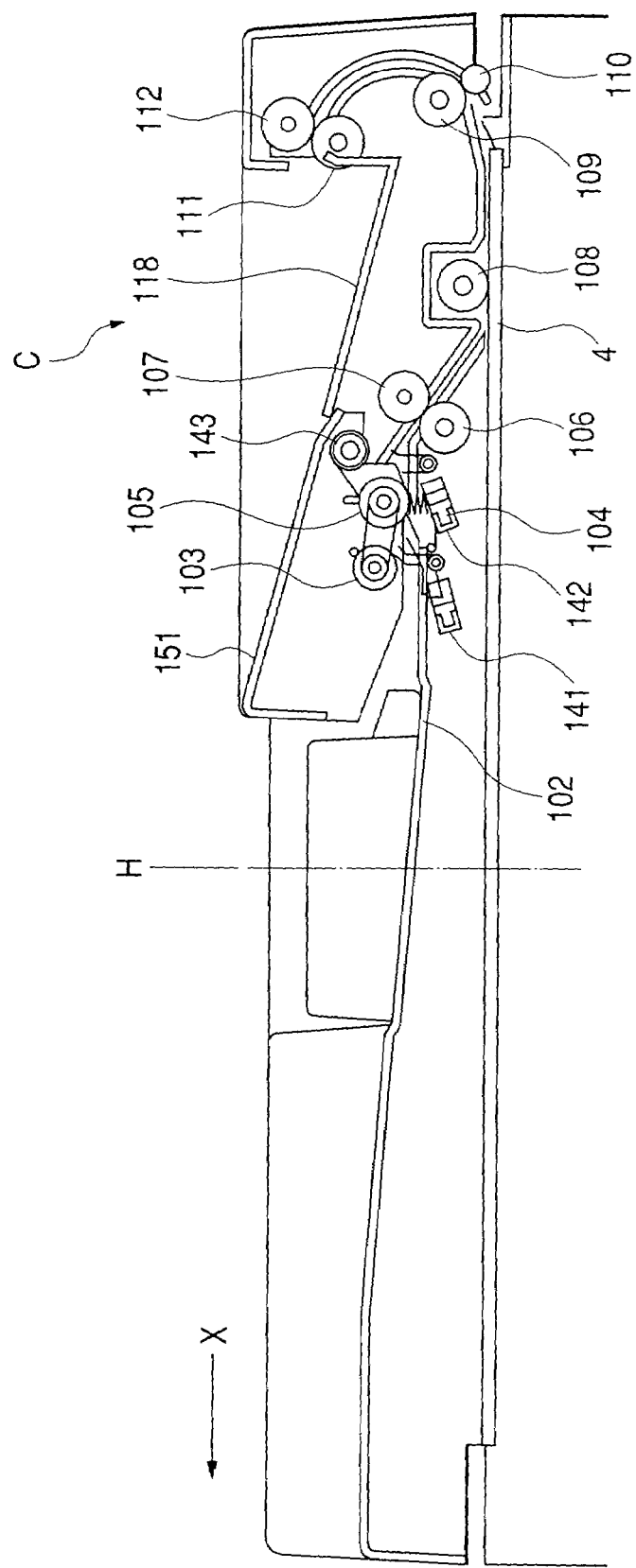
FIG. 5 is a front sectional illustration of the original feeding apparatus.

FIG. 5 is a front sectional illustration of the original feeding apparatus C. The original feeding apparatus C has an original tray 102 on which originals are stacked with their image surfaces facing downward; a pickup roller 103 at a position in which it is opposite to the originals; and a separating portion consisting of a pad 104 and a separating roller 105, downstream of the pickup roller 103. The pickup roller 103 is pivotable on the center of rotation of the separating roller 105 so as to be in contact with the uppermost original (last page) of the original stack with their image surfaces facing downward.

An original set sensor 141 is disposed between the pickup roller 103 and the separating roller 105 to detect whether an original is present on the original tray 102. A registration roller pair 106, 107 is located downstream of the separating roller 105. An ante-registration sensor 142 is provided between the separating roller 105 and the registration roller pair 106, 107 to determine a conveyance amount for conveying the original to the registration rollers 106, 107 by the separating roller 105. Downstream of the registration roller pair 106, 107, a platen roller 108 is provided so as to be able to convey the original while urging the original against the original glass stand 4 of the frame 1 of the image reading portion B.

A conveying roller pair 109, 110 for discharging the original on the original glass stand 4 is provided downstream of the platen roller 108. A discharge roller pair 111, 112 for discharging the original onto a discharge tray 118 is located further downstream.

(Driving System)

Figure 6:
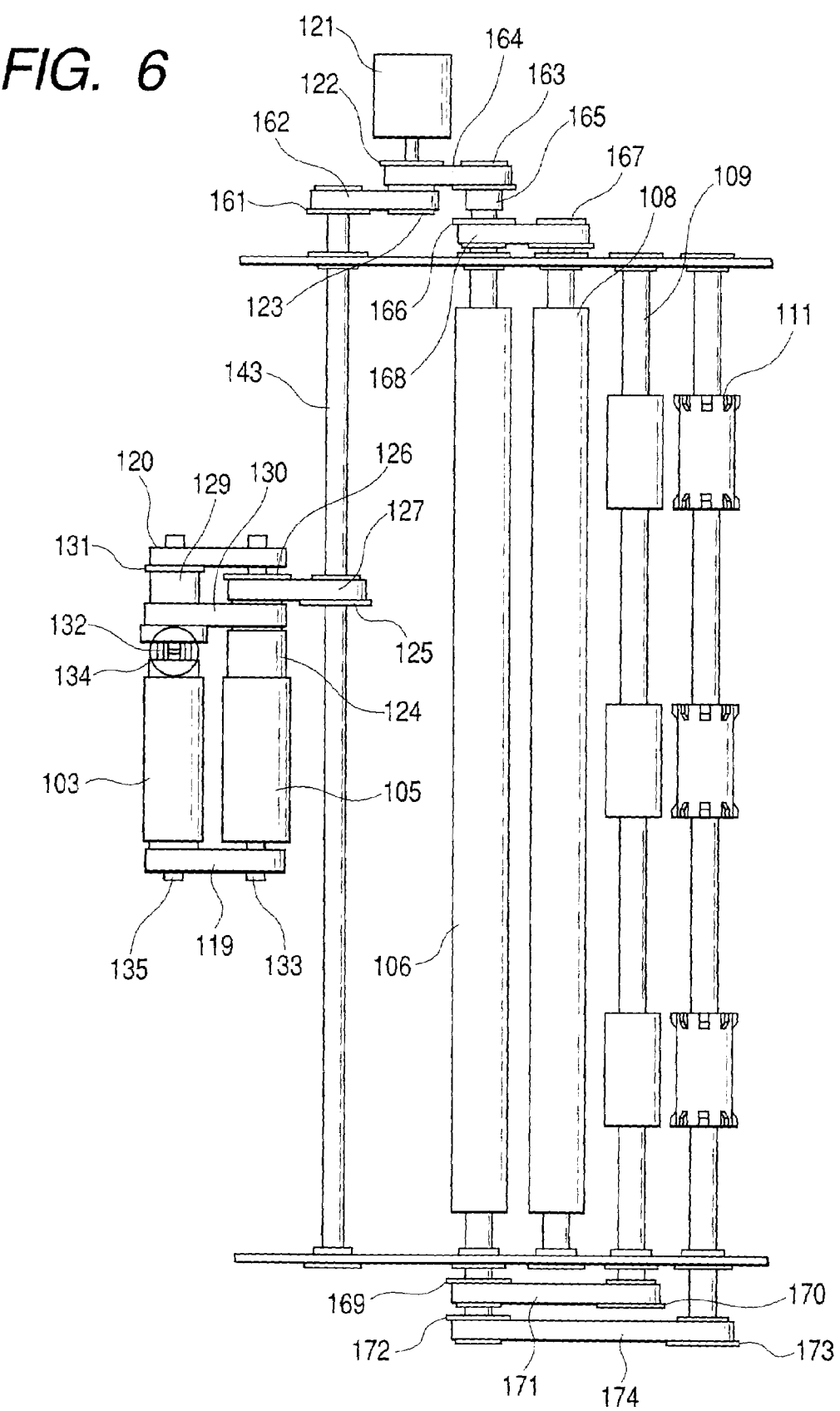
FIG. 6 is an illustration to illustrate the drive of the original feeding apparatus.
Figure 7:
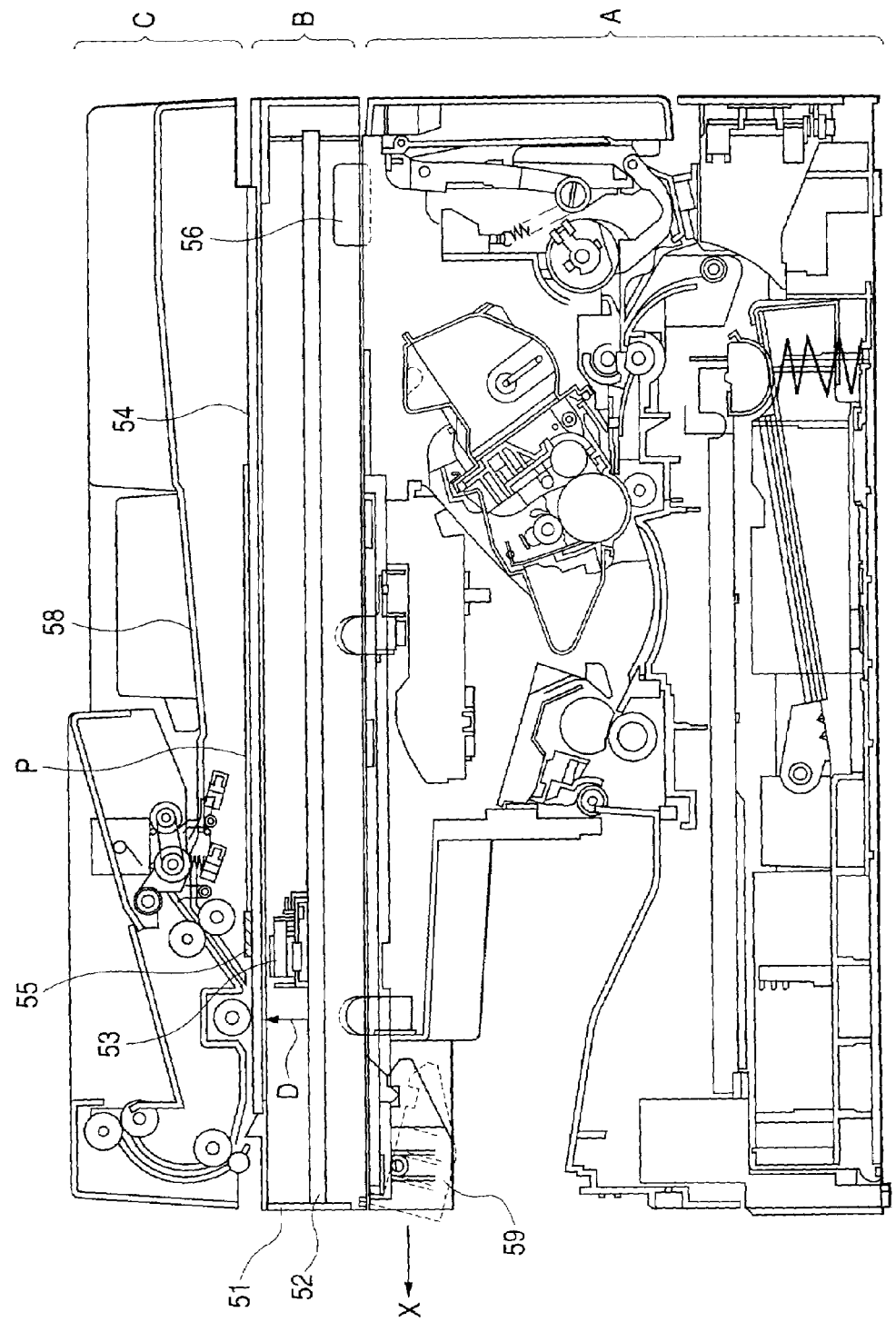
FIG. 7 is a sectional illustration of the image forming apparatus according to the prior art.
Figure 8:
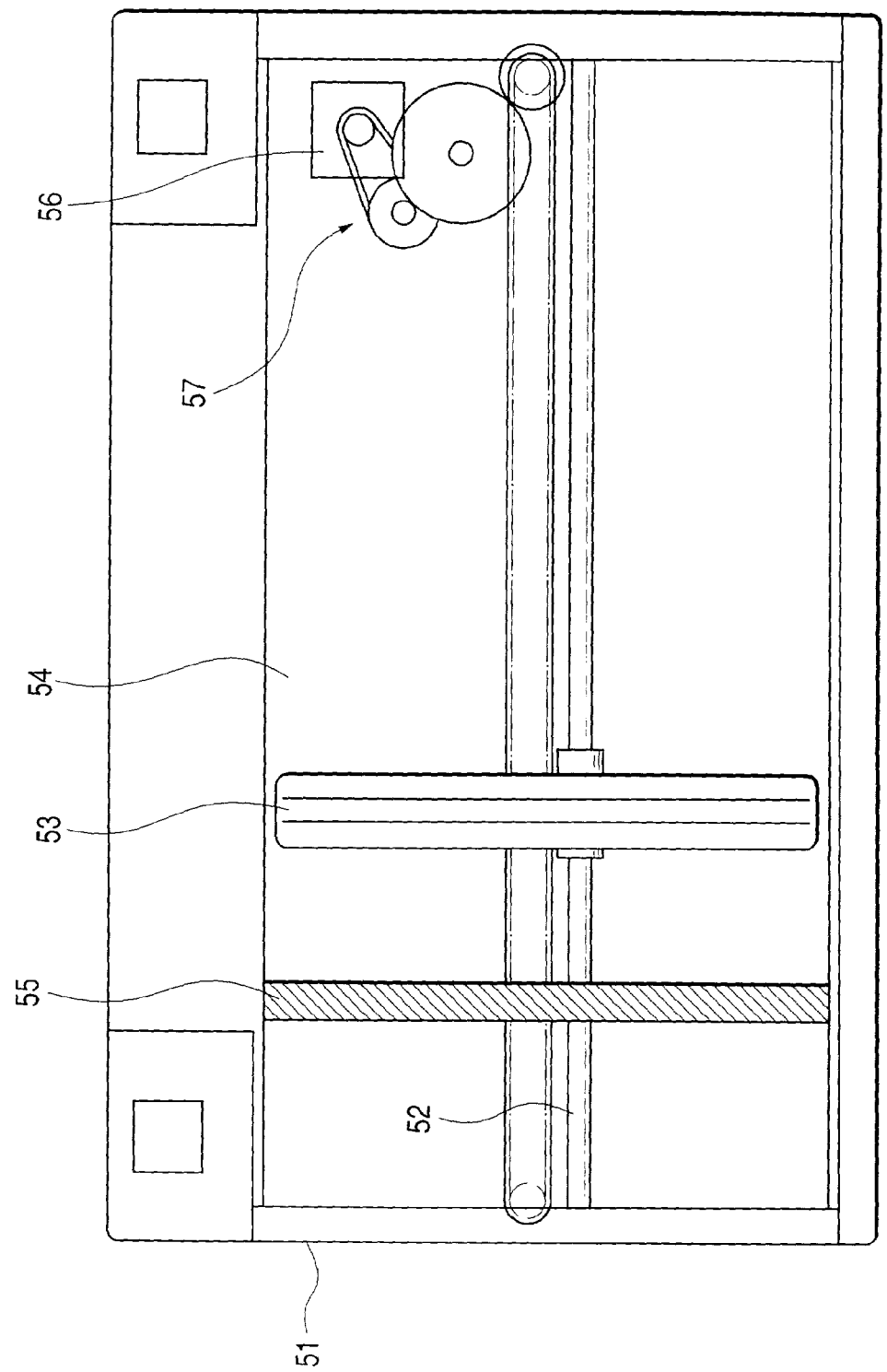
FIG. 8 is a top plan view to illustrate the image reading portion according to the prior art.

FIG. 6 is an illustration illustrating the drive of the original feeding apparatus C, in which rollers are driven by gear train and timing belt. A pulley 123 of a driving motor 121 is connected through a timing belt 162 to a pulley 161 on a feeding drive shaft 143 which is the center of rotation of an openable and closable cover 151 (see FIG. 5). A pulley 125 located on the axis of the feeding drive shaft 143 is connected through a timing belt 127 to a pulley 126 located on a separating roller shaft 133. The pulley 126 is connected through a timing belt 130 to a pulley 129 located on a pickup roller shaft 135, so as to transmit the driving force.

The rotational drive of the pulley 126 is transmitted through a one-way clutch 124 to the separating roller 105. Therefore, the drive is transmitted counterclockwise in FIG. 5, but the drive is not transmitted clockwise. The rotational drive of the pulley 129 is transmitted through a coupling portion 132 to the pickup roller 103. A front feeding arm 119 and a rear feeding arm 120 support the separating roller shaft 133 and the pickup roller shaft 135, and the pickup roller 103 is arranged to be pivotable on the center of rotation of the separating roller shaft 133.

The pickup roller shaft 135 is provided with a frictional member 131 between the pulley 129 and the rear feeding arm 120 and a pressing spring 134 urges it toward the rear feeding arm 120. Accordingly, when the pulley 129 is rotated counterclockwise through the timing belt 130 by the pulley 126, the pickup roller 103 pivots counterclockwise (downward) about the center of the separating roller shaft 133 because of the sliding load of the frictional member 131. When the pulley 126 rotates clockwise reversely, the pickup roller 103 pivots clockwise (upward) about the center of the separating roller shaft 133.

The following will describe a driving system of the registration roller 106, platen roller 108, conveying roller 109, and discharge roller 111.

As shown in FIG. 6, the drive is transmitted from a pulley 122 of the driving motor 121 through a timing belt 164 to a pulley 163. Since a one-way clutch 165 is connected to the pulley 163, only the drive in the direction opposite to the direction of the drive to the separating roller 105 is transmitted to the registration roller 106. Accordingly, the separating roller 105 receives the counterclockwise drive during the forward rotation of the driving motor 121, but the drive is not transmitted to the registration roller 106. During the reverse rotation of the driving motor 121, the drive is not transmitted to the separating roller 105, but the clockwise drive is transmitted to the registration roller 106.

A pulley 166 is provided on the shaft of the registration roller 106 and the drive is transmitted through a timing belt 168 to a pulley 167 on the shaft of the platen roller 108. The drive of pulleys 169, 172 located on the shaft of the registration roller 106 is transmitted through timing belts 171, 174 to a pulley 170 and to a pulley 173 to rotate the conveying roller 109 and the discharge roller 111, respectively.

(Placement of Components)

The pickup roller 103, separating roller 105, registration roller pair 106, 107, platen roller 108, conveying roller pair 109, 110, and discharge roller pair 111, 112, as original conveying members of the original feeding apparatus C, and the driving motor 121, as an original conveying drive portion, are placed so as to be located on the shift-directional rear end side (the right side in FIG. 5) with respect to the center H of the length of the original feeding apparatus C in the shift direction (the direction indicated by the arrow X) of the image reading portion B. For this reason, the barycenter G, hereinafter referred to as the center of gravity, of the original feeding apparatus C is also located on the shift-directional rear end side (the right side in FIG. 4A) with respect to the center H of the length of the original feeding apparatus C in the shift direction X, as shown in FIG. 4A.

Accordingly, when the image reading portion B and the original feeding apparatus C are slid in the shift direction X, for example, in the operation of replacing the process cartridge 6 or the like, as shown in FIG. 3, the position of the center of gravity G of the original feeding apparatus C is located above the image forming portion A, and will never be located at any position protruded from the left side of the image forming portion A. Therefore, the variation is small in the position of the center of gravity of the image forming apparatus and the image forming apparatus can be stably installed. The image reading portion B can be smoothly slid by a small sliding force.

As for the image reading portion B on the other hand, the reader motor 21, which is a sensor conveying drive portion for conveying the original reading sensor 3 in the scanning direction, is located on the shift-directional front end side (the left side in FIG. 1) with respect to the center of the length of the image reading portion B in the shift direction. In the present embodiment it is located near the front end in the shift direction.

In the above configuration, even if the reader motor 21 projects to the image forming portion A side as in the case of the conventional apparatus, the moving range of the reader motor 21 in the image forming portion A is small in the operation of sliding the image reading portion B in the shift direction. For this reason, the cut range of the image forming portion A is small, so that the size of the apparatus can be reduced in the height direction.

What is claimed is:

1. An original feeding apparatus which conveys an original to an image reading portion, and which is placed above an image forming portion and a discharging space disposed at a side of said image forming portion, wherein a recording medium after image formation is to be discharged into the discharging space, said original feeding apparatus being movable integrally with said image reading portion to a side of said discharging space to open a region above said image forming portion so that said image forming portion is accessible and having a center of gravity located at a position that never protrudes beyond said image forming portion after moving of said original feeding apparatus to the side of the discharging space.

2. An original feeding apparatus according to claim 1, comprising an original conveying drive portion which conveys an original, wherein said original conveying drive portion is located on a rear end side with respect to the center of the length of said original feeding apparatus in a moving direction.

3. An original reading apparatus which integrally comprises an original feeding portion and an image reading portion, and which is located above an image forming portion and a discharging space disposed at a side of said image forming portion, wherein a recording medium after image formation is to be discharged into the discharging space, said original reading apparatus being mounted so as to be movable to a side of the discharging space to open a region above said image forming portion so that said image forming portion is accessible and having a center of gravity located at a position that never protrudes beyond said image forming portion after moving of said original reading apparatus to the side of the discharging space.

4. An original reading apparatus according to claim 3, comprising an original conveying drive portion which conveys an original, wherein said original conveying drive portion is located on a rear end side with respect to the center of the length of said original reading apparatus in a moving direction.

5. An image forming apparatus comprising an image forming portion which records an image on a recording medium, an image reading portion which reads information on an original, located above said image forming portion and a discharging space disposed at a side of said image forming portion, wherein the recording medium after image formation is to be discharged onto said discharging space, and an original feeding apparatus which conveys the original to said image reading portion, located above said image reading portion, wherein said original feeding apparatus is movable integrally with said image reading portion to a side of the discharging space to open a region above said image forming portion so that said image forming portion is accessible, and wherein said original feeding apparatus has a center of gravity located at a position that never protrudes beyond said image forming portion after moving of said original feeding apparatus to the side of the discharging space.

6. An image forming apparatus according to claim 5, wherein said original feeding apparatus comprises an original conveying drive portion which conveys an original, and wherein said original conveying drive portion is located on a rear end side with respect to the center of the length of said original feeding apparatus in a moving direction.

7. An image forming apparatus according to claim 6, wherein said image reading portion comprises a reading sensor which reads an image and a sensor conveying drive portion which conveys said reading sensor in a scanning direction, and wherein said sensor conveying drive portion is located on a front end side with respect to the center of the length of said original feeding apparatus in the moving direction.

8. An image forming apparatus according to claim 5 or claim 6, comprising an original reading apparatus integrally having said original feeding apparatus and said image reading portion.

9. An image forming apparatus according to claim 5, wherein said image reading portion comprises a reading sensor which reads an image and a sensor conveying drive portion which conveys said reading sensor in a scanning direction, and wherein said sensor conveying drive portion is located on a front end side with respect to the center of the length of said original feeding apparatus in the moving direction.

* * * * *